United States Patent
Suenaga (10) Patent No.: US 10,196,015 B2
(45) Date of Patent: Feb. 5, 2019

(54) WIRE HOUSING PROTECTOR

(71) Applicant: Sumitomo Wiring Systems, Ltd., Yokkaichi, Mie (JP)

(72) Inventor: Ryo Suenaga, Mie (JP)

(73) Assignee: Sumitomo Wiring Systems, Ltd., Yokkaichi, Mie (JP)

(*) Notice: Subject to any disclaimer, the term of this patent is extended or adjusted under 35 U.S.C. 154(b) by 0 days.

(21) Appl. No.: 15/740,209

(22) PCT Filed: Aug. 20, 2015

(86) PCT No.: PCT/JP2015/073368
§ 371 (c)(1),
(2) Date: Dec. 27, 2017

(87) PCT Pub. No.: WO2017/006494
PCT Pub. Date: Jan. 12, 2017

(65) Prior Publication Data
US 2018/0186314 A1 Jul. 5, 2018

(30) Foreign Application Priority Data
Jul. 6, 2015 (JP) .................. 2015-135668

(51) Int. Cl.
*F16L 55/00* (2006.01)
*B60R 16/02* (2006.01)
*H02G 3/04* (2006.01)

(52) U.S. Cl.
CPC ....... *B60R 16/0215* (2013.01); *H02G 3/0418* (2013.01); *H02G 3/0437* (2013.01); *H02G 3/0487* (2013.01)

(58) Field of Classification Search
CPC .. H02G 3/0418; H02G 3/0437; H02G 3/0487; B60R 16/0215
(Continued)

(56) References Cited

U.S. PATENT DOCUMENTS 4,891,471 A * 1/1990 Ono ................. H02G 3/0418
138/166
4,951,716 A * 8/1990 Tsunoda .............. H02G 3/0418
138/157
(Continued)

FOREIGN PATENT DOCUMENTS

JP H0670415 U 9/1994
JP 2000134759 A 5/2000
(Continued)

OTHER PUBLICATIONS

International Search Report for Application No. PCT/JP2015/073368 dated Oct. 13, 2015; 5 pages.

*Primary Examiner* — James Hook
(74) *Attorney, Agent, or Firm* — Reising Ethington, P.C.

(57) ABSTRACT

An elastic projecting piece insertion hole is defined by an outer wall portion, an inner wall portion that opposes the outer wall portion across a gap, and a left wall portion and a right wall portion that connect edge portions on both sides of the outer wall portion and the inner wall portion. A first tapered surface whose height gradually decreases from an outer edge toward an inner edge is formed at an upper surface of the outer wall portion. An upper surface of the inner wall portion is set to be lower in height than the outer edge of the upper surface of the outer wall portion. Second tapered surfaces whose height gradually decreases from the height of the outer edge of the upper surface of the outer wall portion toward the height of the upper surface of the inner wall portion are respectively formed at upper surfaces of the left wall portion and the right wall portion.

3 Claims, 4 Drawing Sheets (58) Field of Classification Search
USPC ......... 138/162, 166, 167, 108, 168; 174/504
See application file for complete search history.

(56) References Cited

U.S. PATENT DOCUMENTS

| | | | | |
|---|---|---|---|---|
| 5,022,685 | A * | 6/1991 | Stiskin | B29C 65/58 138/166 |
| 6,029,713 | A * | 2/2000 | Miranda | H02G 3/0418 138/162 |
| 6,126,123 | A * | 10/2000 | Yang | B60R 16/0215 248/74.1 |
| 6,335,485 | B1 * | 1/2002 | Benito-Navazo | H02G 3/128 174/497 |
| 8,136,772 | B2 * | 3/2012 | Kurth | H02G 3/0418 174/68.3 |
| 2003/0116215 | A1 * | 6/2003 | Miyamoto | B60R 16/0215 138/157 |
| 2009/0084578 | A1 * | 4/2009 | Irisawa | B60R 16/0215 174/135 |
| 2012/0091290 | A1 | 4/2012 | Shitamichi | |
| 2014/0102744 | A1 | 4/2014 | Suenaga | |
| 2018/0186313 | A1 * | 7/2018 | Suenaga | B60R 16/0215 |
| 2018/0205209 | A1 * | 7/2018 | Suenaga | B60R 16/0215 |
| 2018/0205210 | A1 * | 7/2018 | Suenaga | B60R 16/0215 |

FOREIGN PATENT DOCUMENTS

| | | |
|---|---|---|
| JP | 2004159442 A | 6/2004 |
| JP | 2011036005 A | 2/2011 |
| JP | 2014082880 A | 5/2014 |

\* cited by examiner

WIRE HOUSING PROTECTOR

CROSS REFERENCE TO RELATED APPLICATIONS

This application claims the priority of Japanese patent application JP2015-135668 filed on Jul. 6, 2015, the entire contents of which are incorporated herein.

TECHNICAL FIELD

The present invention relates to a wire housing protector for holding multiple electric wires laid therethrough that are routed inside an automobile or the like.

BACKGROUND ART

Conventionally, in the electric system of automobiles or the like, multiple routed electric wires are laid through and held within a wire housing protector and secured at suitable locations in order to protect the electric wires from external members that might otherwise interfere with the electric wires and restrict the routing of the electric wires.

Incidentally, as described in JP H06-70415U (Patent Document 1) for example, such a wire housing protector is constituted by a trough-shaped protector body and a lid that covers the upper opening of the protector body. Once multiple electric wires are laid through the protector body, the lid is fixed to the protector body by a locking mechanism that protrudes from a sidewall of the protector body. In this way, the protector is capable of holding the multiple electric wires accommodated therein.

However, wire housing protectors having the foregoing conventional structure have an inherent problem in that, because the locking mechanism protrudes outward from a sidewall of the protector body, some of the capacity of the wire housing portion of the protector body is sacrificed so as to secure space for the locking mechanism. Especially in recent years, the demand for downsizing automobiles has been growing while the quantity of on-vehicle electrical equipment has also been increasing. Accordingly, there is a need to increase the housing space inside the protector body without enlarging the space necessary for mounting the wire housing protector. At times, conventionally structured wire housing protectors have been unable to meet this requirement sufficiently. In particular, there have been cases in which the lid could not easily interlock with the protector body because there were too many electric wires for the capacity of the wire housing protector.

Therefore, the applicant proposed, in JP 2014-82880A (Patent Document 2), a wire housing protector including a locking mechanism that is constituted by an elastic projecting piece that projects from an outer peripheral edge of a lid toward a protector body and an elastic projecting piece insertion hole that passes through the inside of a side wall of the protector body and opens in an upper surface, and in which an engagement protrusion provided at a leading end of the elastic projecting piece that has been inserted into the inside of the elastic projecting piece insertion hole engages with an engagement portion that projects from an inner surface of the elastic projecting piece insertion hole so as to prevent the lid from separating from the protector body. According to such a wire housing protector, because the locking mechanism is provided inside the side wall of the protector body, the side wall of the protector body can be extended to a maximum range of the space that is allowed to mount the wire housing protector, compared with a conventional structure in which the locking mechanism protrudes outward from the side wall of the protector body. Therefore, a dead space around the protector body that occurs due to the locking mechanism that protrudes outward from the side wall can be reduced, and the wire accommodating space in the protector body can be increased.

However, wire accommodation protectors having a structure in which the locking mechanism is provided inside the side wall of the protector body in this way suffer from an inherent problem. In particular, the opening area of the elastic projecting piece insertion hole that opens in the upper surface of the side wall of the protector body is inevitably made small, and therefore the task of inserting the elastic projecting piece into the elastic projecting piece insertion hole is difficult. Furthermore, the elastic projecting piece is inserted into the elastic projecting piece insertion hole while the elastic projecting piece is located inward of an outer peripheral surface of the protector body, and as a result, electric wires arranged in the vicinity of the upper surface of the side wall of the protector body are easily caught between the lid and the upper surface of the side wall of the protector body. Thus, further improvement is required.

SUMMARY

The present design has been made in view of the above-described circumstances and, as a solution to the problem, provides a wire housing protector having a new structure in which, even if a locking mechanism is provided inside a side wall of a protector body, assembling the locking mechanism is made easier and electric wires are prevented from being caught.

A first aspect of the design provides a wire housing protector including: a protector body extending in the shape of a trough; a lid for covering an upper opening of the protector body; and a locking mechanism for fixedly holding the protector body and the lid. The locking mechanism includes: an elastic projecting piece that protrudes from the lid and is provided with an engagement protrusion at an outer surface of its leading end; and an elastic projecting piece insertion hole that passes through the inside of a side wall of the protector body and opens in an upper surface of the side wall, and includes an engagement portion that engages with the engagement protrusion. The elastic projecting piece can be inserted into the elastic projecting piece insertion hole while the leading end of the elastic projecting piece is pressed toward an inner wall, and when the elastic projecting piece elastically returns, the engagement protrusion engages with the engagement portion and the lid is held by the protector body. The elastic projecting piece insertion hole is defined by an outer wall portion that constitutes an outer surface of the side wall of the protector body, an inner wall portion that constitutes an inner surface of the side wall of the protector body and opposes the outer wall portion across a gap, and a left wall portion and a right wall portion that connect edge portions on both sides of the outer wall portion and the inner wall portion. A first tapered surface whose height gradually decreases from an outer edge toward an inner edge relative to the elastic projecting piece insertion hole is formed at an upper surface of the outer wall portion. An upper surface of the inner wall portion is set to be lower in height than the outer edge of the upper surface of the outer wall portion. Second tapered surfaces whose height gradually decreases from the height of the outer edge of the upper surface of the outer wall portion toward the height of the upper surface of the inner wall portion are respectively formed at upper surfaces of the left wall portion and the right wall portion.

According to the present aspect, even if the locking mechanism is provided inside the side wall of the protector body in order to increase the electric wire accommodating space in the protector body, the first tapered surface is formed at the upper surface of the outer wall portion that defines the elastic projecting piece insertion hole, and as a result, the leading end of the elastic projecting piece that has been brought into contact with the upper surface of the side wall of the protector body can be smoothly guided to the inside of the elastic projecting piece insertion hole, and assembling the locking mechanism can be made easier.

In addition, because the elastic projecting piece that has been brought into contact with the first tapered surface undergoes flexural deformation from the outside toward the inside of the side wall of the protector body, even if an electric wire is arranged in the vicinity of the upper surface of the side wall of the protector body, the electric wire can be moved to the inside of the protector body from the upper surface of the side wall of the protector body using the movement of the elastic projecting piece, and the electric wire can be advantageously prevented from being caught between the side wall of the protector body and the lid.

Furthermore, since the height of the upper surface of the inner wall portion that defines the elastic projecting piece insertion hole is set to be smaller than the height of the outer edge of the upper surface of the outer wall portion, even if an electric wire is arranged in the vicinity of the upper surface of the side wall of the protector body, the electric wire can be housed in a gap formed between the bottom surface of the lid that is placed on the outer edge of the upper surface of the outer wall portion and the upper surface of the inner wall portion, and the electric wire can be advantageously prevented from being caught.

In addition, the second tapered surfaces whose height gradually decreases from the height of the outer edge of the upper surface of the outer wall portion toward the height of the upper surface of the inner wall portion are respectively formed at the upper surfaces of the left wall portion and the right wall portion that define the elastic projecting piece insertion hole, and therefore an electric wire arranged in the vicinity of the upper surface of the side wall of the protector body can be securely guided toward the inner wall portion side, and the electric wire can be prevented from being caught. As described above, in the present aspect, even if the locking mechanism is provided inside the side wall of the protector body in order to increase the volume of electric wires that can be accommodated, assembling the locking mechanism is made easier and electric wires are prevented from being caught.

A second aspect of the design provides the wire housing protector according to the first aspect, wherein, in the side wall of the protector body, the inner wall portion of the elastic projecting piece insertion hole and portions of the left wall portion and the right wall portion protrude further toward the inside of the protector body than the inner surface in a region in which the elastic projecting piece insertion hole is not formed.

In the present aspect, the inner wall portion of the elastic projecting piece insertion hole and portions of the left wall portion and the right wall portion protrude toward the inside of the protector body than the inner surface of the side wall of the protector body in a region in which the elastic projecting piece insertion hole is not formed. Accordingly, the force needed to insert the elastic projecting piece can be reduced while maintaining the capacity of the elastic projecting piece insertion hole, and therefore assembling the locking mechanism can be made easier. Furthermore, portions of the left wall portion and the right wall portion protrude toward the inside of the protector body, and as a result, the second tapered surfaces can be provided while securing the rigidity of the elastic projecting piece insertion hole, and the engagement in the locking mechanism can be made more stable, and the electric wire can be prevented from being caught as well.

A third aspect of the design provides the wire housing protector according to the first or second aspect, wherein a third tapered surface whose height gradually decreases from an outer edge to an inner edge relative to the elastic projecting piece insertion hole is formed at an upper surface of the inner wall portion of the elastic projecting piece insertion hole, the height of the outer edge of the inner wall portion is larger than the height of the inner edge of the outer wall portion, and the second tapered surface is connected to the inner wall portion at the height of the outer edge of the inner wall portion.

According to the present aspect, the third tapered surface whose height gradually decreases from the outer edge to the inner edge relative to the elastic projecting piece insertion hole is formed at the upper surface of the inner wall portion of the elastic projecting piece insertion hole, as a result, the leading end of the elastic projecting piece that has been brought into contact with the first tapered surface and undergone flexural deformation toward the inside is brought into contact with the third tapered surface and is guided toward the inside of the elastic projecting piece insertion hole. In particular, since the height of the outer edge of the inner wall portion is higher than the height of the inner edge of the outer wall portion, the leading end of the elastic projecting piece can be invariably brought into contact with the third tapered surface and guided to the inside of the elastic projecting piece insertion hole before the flexural deformation is maximized, and assembling the locking mechanism can be made easier.

Furthermore, the second tapered surface is connected to the inner wall portion at the height of the outer edge of the inner wall portion, and therefore an electric wire arranged in the vicinity of the upper surface of the side wall of the protector body can be securely guided toward the inside of the protector body by the second tapered surface, and the electric wire is prevented from being guided to the inside of the elastic projecting piece insertion hole by the third tapered surface. Accordingly, assembling the locking mechanism can be made easier while at the same time preventing electric wires from being caught.

According to the wire housing protector, even if the locking mechanism is provided inside the side wall of the protector body, the first tapered surface is formed at the upper surface of the outer wall portion that defines the elastic projecting piece insertion hole, and as a result, the leading end of the elastic projecting piece that has been brought into contact with the upper surface can be smoothly guided to the inside of the elastic projecting piece insertion hole, and assembling the locking mechanism can be made easier. Also, because the elastic projecting piece that has been brought into contact with the first tapered surface undergoes flexural deformation from the outside toward the inside of the side wall, even if an electric wire is arranged in the vicinity of the upper surface of the side wall, the electric wire can be moved to the inside of the protector body from the upper surface of the side wall, and the electric wire can be advantageously prevented from being caught between the side wall and the lid. Furthermore, the upper surface of the inner wall portion is lower than the outer edge of the upper surface of the outer wall portion, and therefore an electric wire that has been arranged in the vicinity of the upper surface can be housed between the bottom surface of the lid and the upper surface of the inner wall portion, and the electric wire can be advantageously prevented from being caught. In addition, the second tapered surfaces whose height gradually decreases from the outer edge of the upper surface of the outer wall portion toward the upper surface of the inner wall portion are respectively formed at the upper surfaces of the left wall portion and the right wall portion, and therefore an electric wire arranged in the vicinity of the upper surface can be securely guided toward the inner wall portion side, and the electric wire can be prevented from being caught. As described above, in the present aspect, even if the locking mechanism is provided inside the side wall of the protector body in order to increase the volume of electric wires that can be accommodated, assembling the locking mechanism is made easier and electric wires are prevented from being caught.

DESCRIPTION OF EMBODIMENTS

Hereinafter, embodiments of the present design will be described with reference to the drawings.

First, a wire housing protector 10 according to one embodiment is shown in FIGS. 1 to 4. The wire housing protector 10 is constituted by a protector body 12 extending in the shape of a trough and a lid 16 that covers the upper opening 14 of the protector body 12. When in use, the wire housing protector 10 accommodates a wire harness (not shown) laid through the protector body 12. Also, in the following description, "upward" refers to the upward direction in FIG. 1, "downward" refers to the downward direction in FIG. 1, "forward" refers to the leftward direction in FIG. 1, and "backward" refers to the rightward direction in FIG. 1.

Figure 2:
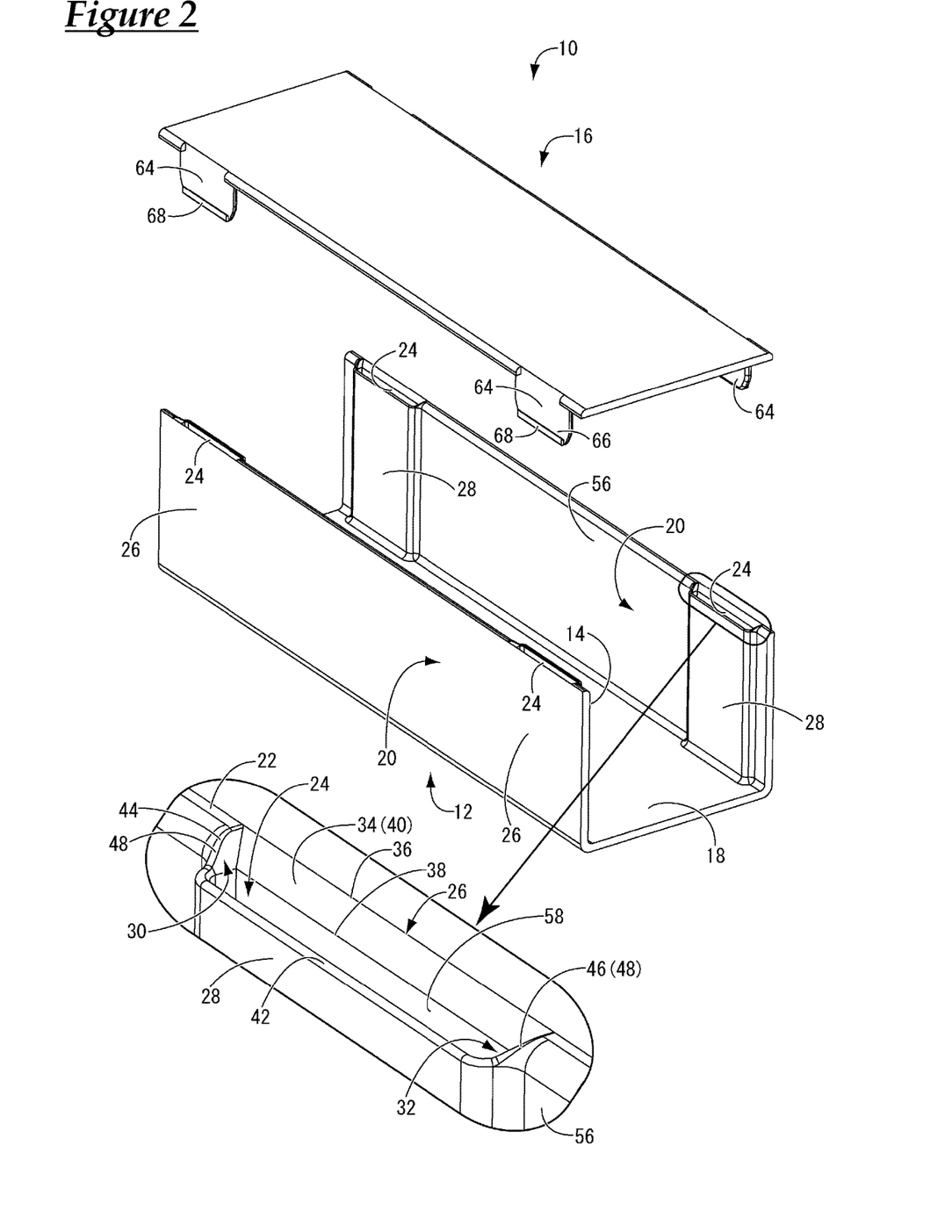
FIG. 2 is an exploded perspective view of the wire housing protector shown in FIG. 1.

As shown in FIG. 2, the protector body 12 is configured to extend in the shape of a trough, includes a bottom wall 18 and a pair of sidewalls 20 rising upright from both sides of the bottom wall 18, and is integrally formed of synthetic resin such as polypropylene (PP) or polyamide (PA), for example, by injection molding or the like. Also, elastic projecting piece insertion holes 24 that pass through inside a side wall 20 in a height direction and open in an upper surface 22 of the side wall 20 are provided in the side wall 20 of the protector body 12.

Figure 4:
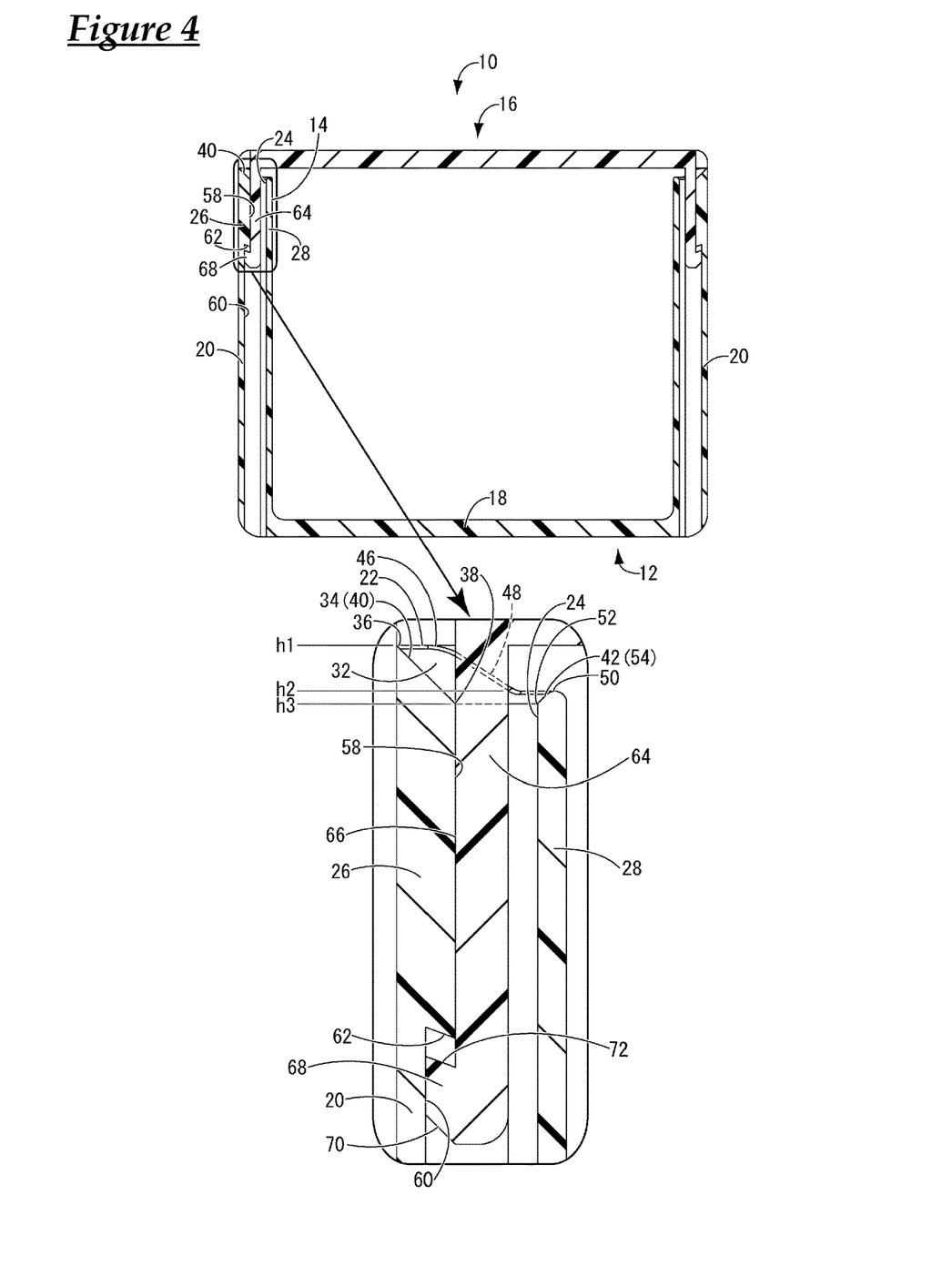
FIG. 4 is an enlarged cross section taken along line IV-IV in FIG. 3.

Specifically, as shown in FIG. 2, the elastic projecting piece insertion hole 24 is defined by an outer wall portion 26 having a substantially rectangular flat plate shape in side view that constitutes an outer surface of the side wall 20 of the protector body 12, an inner wall portion 28 having a substantially similar shape as the outer wall portion 26 in side view that constitutes an inner surface of the side wall 20 of the protector body 12 and opposes the outer wall portion 26 across a gap, and a left wall portion 30 and a right wall portion 32 having a substantially elongated flat plate shape in front view that connect outer edge portions on both sides of the outer wall portion 26 and the inner wall portion 28. Also, as shown in FIG. 4, a first tapered surface 40 that is a tapered sloping surface whose height gradually decreases from an outer edge 36 to an inner edge 38 relative to the elastic projecting piece insertion hole 24 is formed at an upper surface 34 of the outer wall portion 26. An upper surface 42 of the inner wall portion 28 is set to be lower in height than the outer edge 36 of the upper surface 34 of the outer wall portion 26. Also, as shown in FIG. 2, second tapered surfaces 48 that are each a tapered sloping surface whose height gradually decreases from the height of the outer edge 36 of the upper surface 34 of the outer wall portion 26 toward the height of the upper surface 42 of the inner wall portion 28 are respectively formed at an upper surface 44 of the left wall portion 30 and an upper surface 46 of the right wall portion 32.

Furthermore, as shown in FIG. 4, a third tapered surface 54 that is a tapered sloping surface whose height gradually decreases from an outer edge 50 to an inner edge 52 relative to the elastic projecting piece insertion hole 24 is formed at the upper surface 42 of the inner wall portion 28 of the elastic projecting piece insertion hole 24. Also, the height h2 of the outer edge 50 of the upper surface 42 (third tapered surface 54) of the inner wall portion 28 is larger than the height h3 of the inner edge 38 of the upper surface 34 (first tapered surface 40) of the outer wall portion 26. The second tapered surface 48 is connected to the upper surface 42 of the inner wall portion 28 at the height h2 of the outer edge 50 of the upper surface 42 (third tapered surface 54) of the inner wall portion 28. Accordingly, the height h3 of the inner edge 52 of the upper surface 42 (third tapered surface 54) of the inner wall portion 28 is the smallest. Note that, in FIG. 4, a cross section of the elastic projecting piece insertion hole 24 that is located on the front side in FIG. 2 is shown, and therefore the right wall portion 32 is visible. In addition, as shown in FIG. 2, in the side wall 20 of the protector body 12, the inner wall portion 28 of the elastic projecting piece insertion hole 24 and portions of the left wall portion 30 and the right wall portion 32 protrude slightly further toward the inside of the protector body 12 than an inner surface 56 in a region in which the elastic projecting piece insertion hole 24 is not formed.

Note that, in the present embodiment, as shown in FIG. 2, two elastic projecting piece insertion holes 24 are formed in each of a back side and a front side of the side wall 20, but any number of elastic projecting piece insertion holes 24 that are separated in a longitudinal direction (left-right direction in FIG. 2) may be provided as necessary. Also, as shown in FIG. 4, an engagement portion 60 having a substantially recessed shape, which is formed by cutting out a portion, on a lower side, of an inner surface 58 of the outer wall portion 26 that defines the elastic projecting piece insertion hole 24, is provided in the elastic projecting piece insertion hole 24. An upper end surface 62 of the engagement portion 60 is a sloping surface that slopes obliquely downward toward the inside of the protector body 12.

Meanwhile, as shown in FIG. 2, the lid 16 is provided with, at its outer edge, a plurality of elastic projecting pieces 64 that each have a substantially rectangular shape, project toward the protector body 12, and are flexible in a plate thickness direction. Also, an engagement protrusion 68 that protrudes outward in a plate thickness direction is provided at an outer surface 66 of a leading end of the elastic projecting piece 64. Furthermore, as shown in FIG. 4, a lower end surface 70 of the engagement protrusion 68 is a tapered surface that gradually slopes outward from a lower end side toward an upper end side in a direction in which the protector body 12 and the lid 16 are assembled. An upper end surface 72 of the engagement protrusion 68 is a sloping surface that slopes obliquely downward toward the inside of the protector body 12, similarly to the upper end surface 62 of the engagement portion 60 of the elastic projecting piece insertion hole 24. Note that, in the present embodiment, four elastic projecting pieces 64 are formed in correspondence with the elastic projecting piece insertion holes 24 described above. Also, the lid 16 is, similarly to the protector body 12, integrally formed of synthetic resin such as polypropylene (PP) or polyamide (PA), for example, by injection molding or the like, but is formed separately from the protector body 12.

Figure 1:
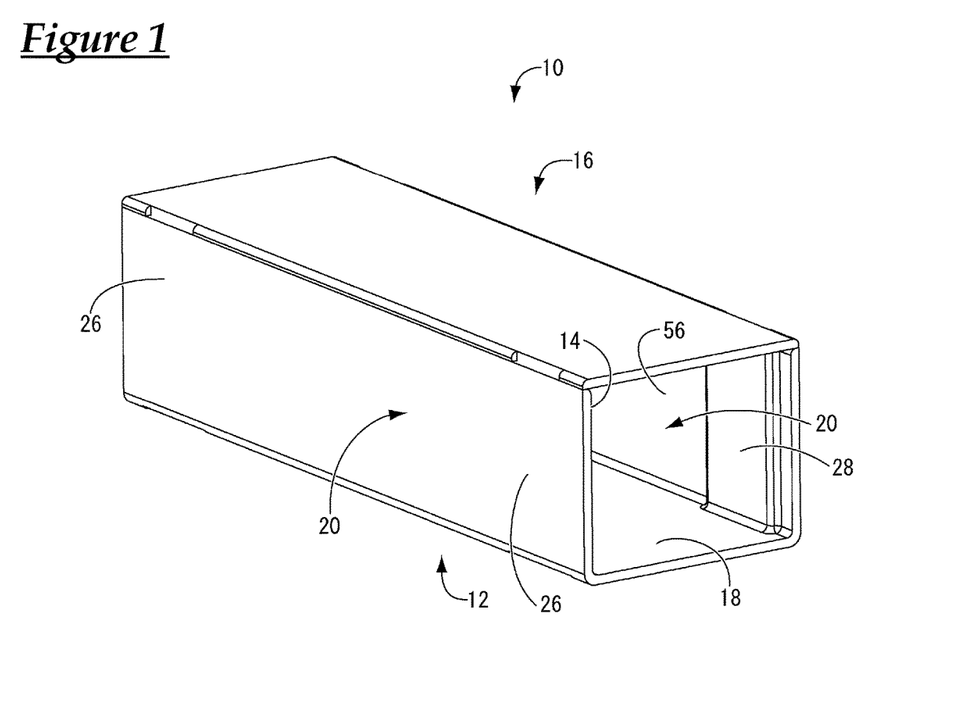
FIG. 1 is a general perspective view of a wire housing protector according to one embodiment of the present design.
Figure 3:
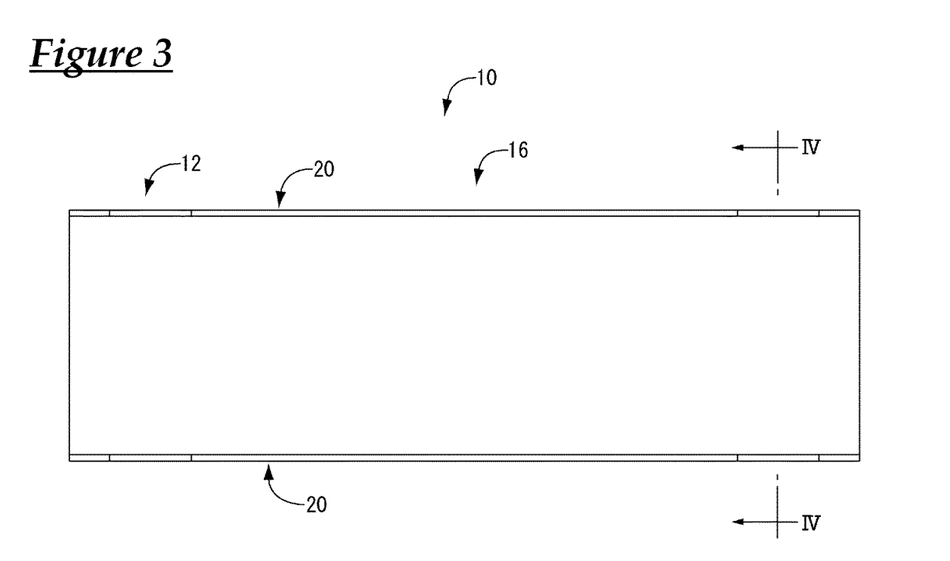
FIG. 3 is a plan view of the wire housing protector shown in FIG. 1.

The plurality of elastic projecting pieces 64 of the lid 16 are inserted into the respectively corresponding plurality of elastic projecting piece insertion holes 24 of the protector body 12, the engagement portions 60 of the elastic projecting piece insertion holes 24 are respectively engaged with the engagement protrusions 68 of the elastic projecting pieces 64, and as a result, the lid 16 is fixedly held by the protector body 12, as shown in FIGS. 1 and 3. In this way, in the present embodiment, the locking mechanism is configured by the engagement portions 60 of the elastic projecting piece insertion holes 24 and the engagement protrusions 68 of the elastic projecting pieces 64.

Next, with reference to FIG. 4, the locking mechanism will be described in detail. First, the leading end of the elastic projecting piece 64 of the lid 16 is inserted into the elastic projecting piece insertion hole 24. Because the lower end surface 70 of the engagement protrusion 68 that constitutes a leading end portion of the elastic projecting piece 64 is a tapered sloping surface, as a result of pushing the leading end of the elastic projecting piece 64 of the lid 16 in a direction toward the protector body 12, the leading end of the elastic projecting piece 64 is inserted into the elastic projecting piece insertion hole 24 while the leading end is pressed toward the inner surface side of the protector body 12, that is, toward a side opposite to the projection side of the engagement protrusion 68, due to an action of the tapered sloping surface. The engagement portion 60 that is formed by cutting out the lower side of the inner surface 58 of the outer wall portion 26 and has a substantially recessed shape is provided in the elastic projecting piece insertion hole 24. Therefore, when the elastic projecting piece 64 is further pushed deep into the elastic projecting piece insertion hole 24 and the engagement protrusion 68 formed at the leading end of the elastic projecting piece 64 passes over the upper end surface 62 of the engagement portion 60, the elastic projecting piece 64 elastically returns, and the engagement protrusion 68 is inserted into the engagement portion 60 of the elastic projecting piece insertion hole 24. Accordingly, the engagement protrusion 68 of the elastic projecting piece 64 is engaged with the engagement portion 60 of the elastic projecting piece insertion hole 24, and the lid 16 is fixedly held by the protector body 12.

According to the wire housing protector 10 of the present embodiment having such a structure, in a structure in which the locking mechanism is provided inside the side wall 20 of the protector body 12, even in a case where the opening area of the elastic projecting piece insertion hole 24 that opens in the upper surface 22 of the side wall 20 of the protector body 12 needs to be small, as a result of forming the first tapered surface 40 at the upper surface 34 of the outer wall portion 26 that defines the elastic projecting piece insertion hole 24, the leading end of the elastic projecting piece 64 of the lid 16 can be smoothly inserted into the elastic projecting piece insertion hole 24 when the lid 16 is attached to the protector body 12 due to an action of the first tapered surface 40. Accordingly, the situation in which the task of inserting the elastic projecting piece into the elastic projecting piece insertion hole is difficult can be corrected, and the locking mechanism can be more easily assembled.

Furthermore, the leading end of the elastic projecting piece 64 of the lid 16 undergoes flexural deformation in a direction from the outer edge 36 toward the inner edge 38 of the outer wall portion 26 of the elastic projecting piece insertion hole 24 due to an action of the first tapered surface 40, and as a result, even in a case where an unshown electric wire is arranged in the vicinity of the upper surface 22 of the side wall 20 of the protector body 12, the electric wire can be moved from the upper surface 22 of the side wall 20 to the inside of the protector body 12. Accordingly, the electric wire can be advantageously prevented from being caught between the upper surface 22 of the side wall 20 and the lid 16. Furthermore, the height of the upper surface 42 (third tapered surface 54) of the inner wall portion 28 that defines the elastic projecting piece insertion hole 24, that is, the maximum height h2 of the upper surface 42 is set to be smaller than the height h1 of the outer edge 36 of the upper surface 34 (first tapered surface 40) of the outer wall portion 26, and therefore an electric wire that is arranged in the vicinity of the upper surface 22 of the side wall 20 of the protector body 12 can be housed in a gap formed between the lid 16 placed on the outer edge 36 of the upper surface 34 of the outer wall portion 26 and the upper surface 42 of the inner wall portion 28, and as a result, the electric wire can be further advantageously prevented from being caught. In addition, second tapered surfaces 48 whose height gradually decreases from the height h1 of the outer edge 36 of the upper surface 34 (first tapered surface 40) of the outer wall portion 26 toward the height h2 of the upper surface 42 of the inner wall portion 28 are respectively formed at the upper surface 44 of the left wall portion 30 and the upper surface 46 of the right wall portion 32 that define the elastic projecting piece insertion hole 24. Accordingly, even in a case where an electric wire is arranged in the vicinity of the upper surface 22 of the side wall 20, the electric wire can be guided to the inner wall portion 28 side due to an action of the second tapered surfaces 48, and the electric wire can be prevented from being caught. As described above, even if the locking mechanism is provided inside the side wall 20 of the protector body 12 in order to increase the volume of electric wires that can be accommodated, assembling the locking mechanism is made easier and electric wires are prevented from being caught.

Also, the third tapered surface 54 whose height gradually decreases from the outer edge 50 toward the inner edge 52 relative to the elastic projecting piece insertion hole 24 is formed at the upper surface 42 of the inner wall portion 28 of the elastic projecting piece insertion hole 24, and therefore the leading end of the elastic projecting piece 64 that has undergone flexural deformation toward the inside of the elastic projecting piece insertion hole 24 due to an action of the first tapered surface 40 is guided to the inside of the elastic projecting piece insertion hole 24 due to an action of the third tapered surface 54. Furthermore, since the height h2 of the outer edge 50 of the upper surface 42 (third tapered surface 54) of the inner wall portion 28 is larger than the height h3 of the inner edge 38 of the upper surface 34 (first tapered surface 40) of the outer wall portion 26, the leading end of the elastic projecting piece 64 can be invariably brought into contact with the third tapered surface 54 and guided to the inside of the elastic projecting piece insertion hole 24 before the flexural deformation is maximized. Therefore, assembling the locking mechanism can be made even easier. Furthermore, the second tapered surfaces 48 are connected to the upper surface 42 of the inner wall portion 28 at the height h2 of the outer edge 50 of the upper surface 42 (third tapered surface 54) of the inner wall portion 28, and therefore, even if an electric wire is arranged in the vicinity of the upper surface 22 of the side wall 20, the electric wire can be securely moved to the inside of the protector body 12 due to an action of the second tapered surface 48. Accordingly, an electric wire is advantageously prevented from being guided to the inside of the elastic projecting piece insertion hole 24 due to an action of the third tapered surface 54. Therefore, assembling the locking mechanism is made easier while at the same time preventing electric wires from being caught.

In addition, in the side wall 20 of the protector body 12, the inner wall portion 28 of the elastic projecting piece insertion hole 24 and portions of the left wall portion 30 and the right wall portion 32 protrude slightly further toward the inside of the protector body 12 than the inner surface 56 in a region in which the elastic projecting piece insertion hole 24 is not formed. Accordingly, the force needed to insert the elastic projecting piece 64 can be reduced while maintaining the capacity of the elastic projecting piece insertion hole 24, and therefore assembling the locking mechanism can be made easier. Also, since portions of the left wall portion 30 and the right wall portion 32 protrude toward the inside of the protector body 12, the second tapered surface 48 can be provided while securing the rigidity of the elastic projecting piece insertion hole 24, and as a result, the engagement in the locking mechanism can be made more stable, and the electric wire can be prevented from being caught as well.

Although embodiments of the present design have been described in detail above, the present invention is not limited by these specific descriptions. For example, in the embodiments described above, the first to third tapered surface 40, 48, and 54 are provided, but the third tapered surface 54 is not necessarily required.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Wire housing protector
12: Protector body
14: Upper opening
16: Lid
20: Side wall
22: Upper surface
24: Elastic projecting piece insertion hole (locking mechanism)
26: Outer wall portion
28: Inner wall portion
30: Left wall portion
32: Right wall portion
34: Upper surface
36: Outer edge
38: Inner edge
40: First tapered surface
42: Upper surface
44: Upper surface
46: Upper surface
48: Second tapered surface fi
50: Outer edge
52: Inner edge
54: Third tapered surface
56: Inner surface
60: Engagement portion
64: Elastic projecting piece (locking mechanism)
66: Outer surface
68: Engagement protrusion

The invention claimed is:
1. A wire housing protector comprising:
a protector body extending in the shape of a trough;
a lid for covering an upper opening of the protector body; and
a locking mechanism for fixedly holding the protector body and the lid,
wherein the locking mechanism includes:
an elastic projecting piece that protrudes from the lid and is provided with an engagement protrusion at an outer surface of its leading end; and
an elastic projecting piece insertion hole that passes through the inside of a side wall of the protector body and opens in an upper surface of the side wall, and includes an engagement portion that engages with the engagement protrusion,
wherein the wire housing protector is configured such that the elastic projecting piece can be inserted into the elastic projecting piece insertion hole while the leading end of the elastic projecting piece is pressed toward an inner wall, and when the elastic projecting piece elastically returns, the engagement protrusion engages with the engagement portion and the lid is held by the protector body,
wherein the elastic projecting piece insertion hole is defined by an outer wall portion that constitutes an outer surface of the side wall of the protector body, an inner wall portion that constitutes an inner surface of the side wall of the protector body, and opposes the outer wall portion across a gap, and a left wall portion and a right wall portion that connect edge portions on both sides of the outer wall portion and the inner wall portion, wherein a first tapered surface whose height gradually decreases from an outer edge toward an inner edge relative to the elastic projecting piece insertion hole is formed at an upper surface of the outer wall portion, an upper surface of the inner wall portion is set to be lower in height than the outer edge of the upper surface of the outer wall portion, and second tapered surfaces whose height gradually decreases from the height of the outer edge of the upper surface of the outer wall portion toward the height of the upper surface of the inner wall portion are respectively formed at upper surfaces of the left wall portion and the right wall portion.

2. The wire housing protector according to claim 1, wherein, in the side wall of the protector body, the inner wall portion of the elastic projecting piece insertion hole and portions of the left wall portion and the right wall portion protrude further toward the inside of the protector body than the inner surface in a region in which the elastic projecting piece insertion hole is not formed.

3. The wire housing protector according to claim 1, wherein a third tapered surface whose height gradually decreases from an outer edge to an inner edge relative to the elastic projecting piece insertion hole is formed at an upper surface of the inner wall portion of the elastic projecting piece insertion hole, the height of the outer edge of the inner wall portion is larger than the height of the inner edge of the outer wall portion, and the second tapered surface is connected to the inner wall portion at the height of the outer edge of the inner wall portion.

* * * * *